Aug. 18, 1964
V. T. ORN ETAL
3,145,046
TRANSPORTABLE CABIN CONSTRUCTION
Filed Aug. 27, 1962
3 Sheets-Sheet 1
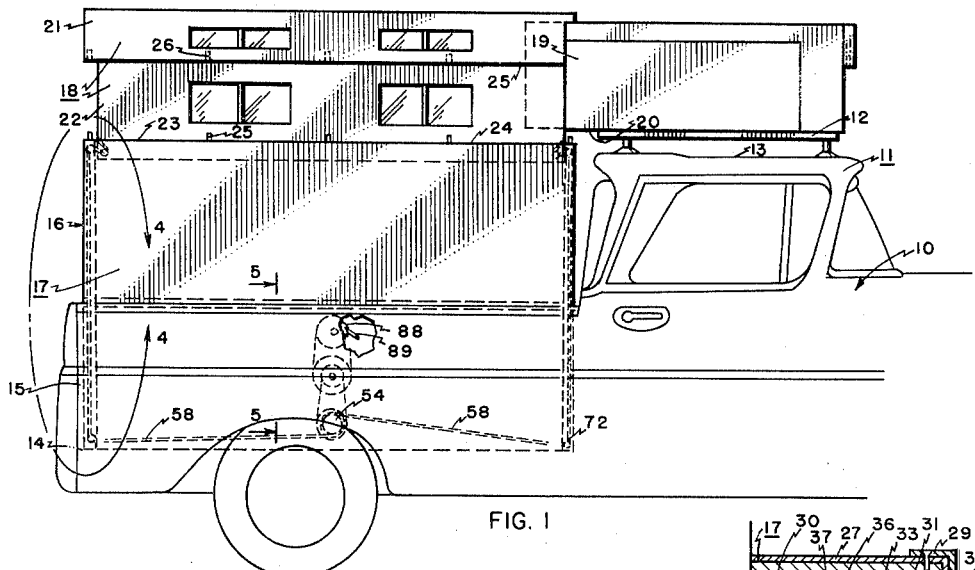
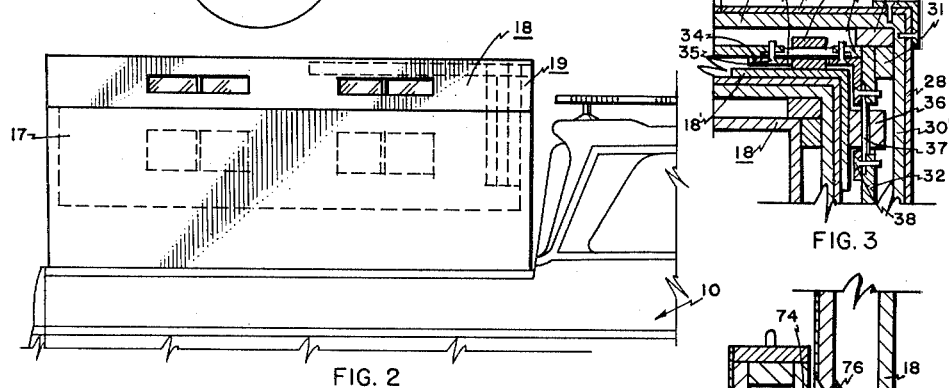
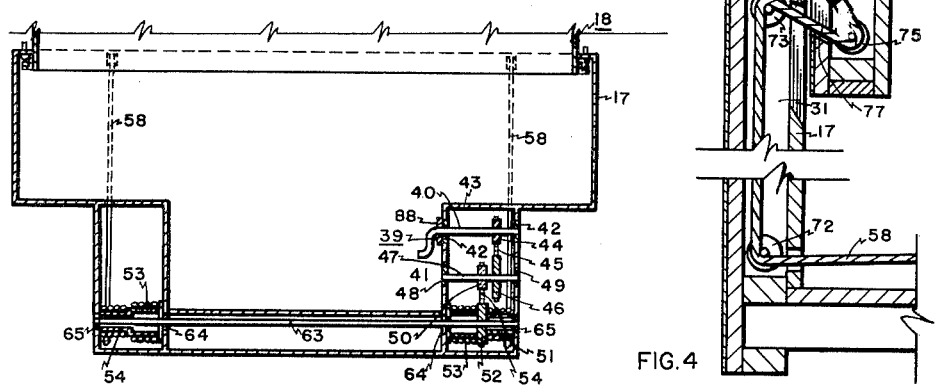
INVENTORS
VICTOR T. ORN
CHARLES D. DRYER
BY M. Ralph Shaffer
THEIR ATTORNEY Aug. 18, 1964  V. T. ORN ETAL  3,145,046
TRANSPORTABLE CABIN CONSTRUCTION
Filed Aug. 27, 1962  3 Sheets-Sheet 2

*INVENTORS*
VICTOR T. ORN
CHARLES D. DRYER
BY
THEIR ATTORNEY

Aug. 18, 1964   V. T. ORN ETAL   3,145,046
TRANSPORTABLE CABIN CONSTRUCTION
Filed Aug. 27, 1962   3 Sheets-Sheet 3
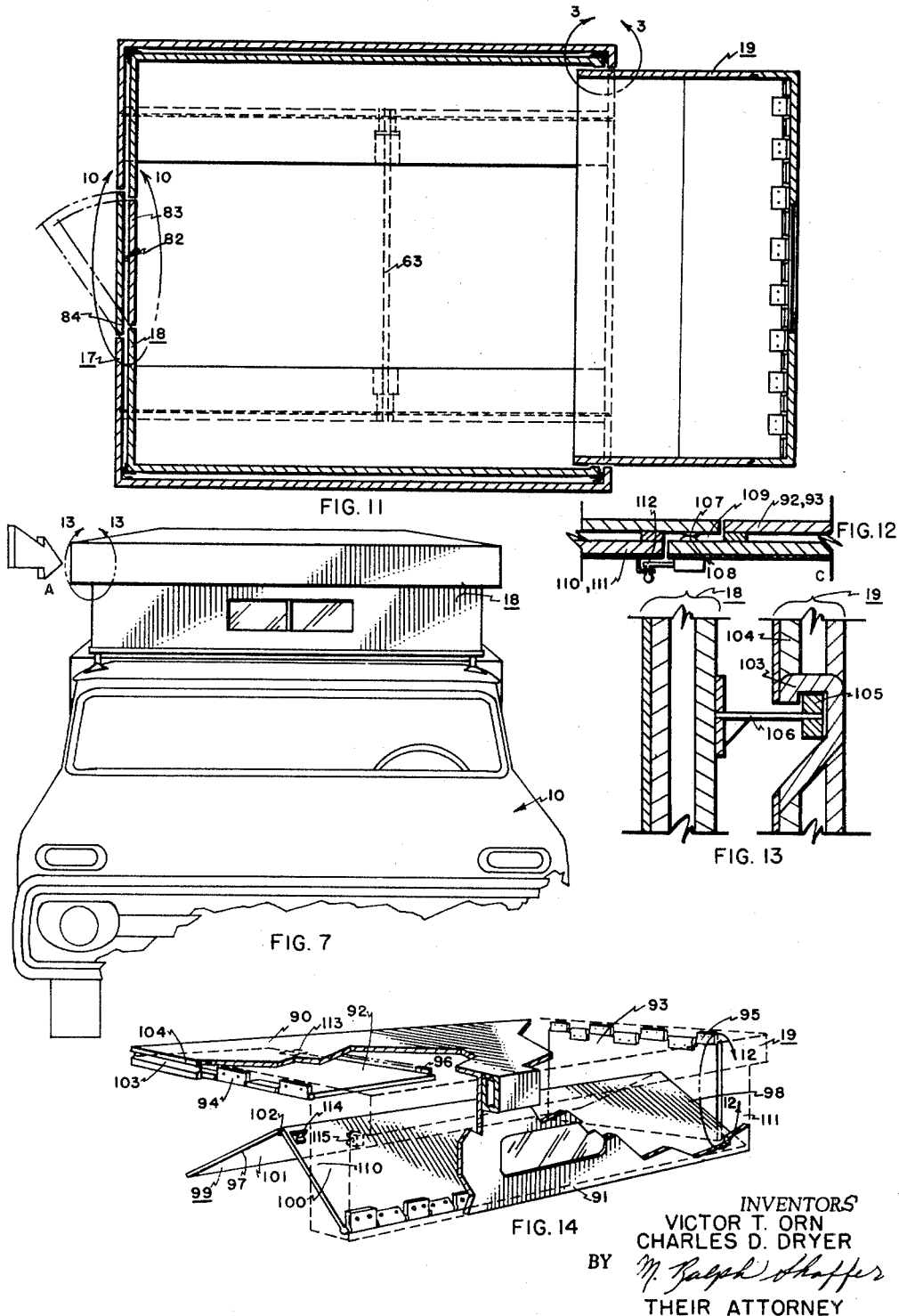
INVENTORS
VICTOR T. ORN
CHARLES D. DRYER
BY
THEIR ATTORNEY

United States Patent Office 3,145,046
Patented Aug. 18, 1964

3,145,046
TRANSPORTABLE CABIN CONSTRUCTION
Victor T. Orn, 2159 Hugo Ave., and Charles D. Dryer, 6265 S. Highland, both of Salt Lake City, Utah
Filed Aug. 27, 1962, Ser. No. 219,421
3 Claims. (Cl. 296—26)

The present invention relates to transportable cabin constructions and, more particularly, to a new and improved construction of the type described which may be collapsed to lower the center of gravity thereof during transport and, when a camping place is reached, elevated so as to provide an enlarged enclosure area for occupancy.

Accordingly, a principal object of the present invention is to provide a collapsible construction of a unique type such as to facilitate the lowering of gravity thereof during transport and the erection thereof at desired intervals and in a convenient manner.

A further object of the invention is to provide a cabin construction which telescopes in two directions so that the top enclosure member may be telescopically related with its bottom enclosure member, and with a front enclosure member or sleeper being so constructed and arranged with respect to the former as to be adapted for telescopic translation over the cab of a towing vehicle, for example, for support thereby.

A further object of the invention is to provide a telescopic type cabin construction wherein maximum enclosure space is enjoyed not only during erection position but also during collapsed position, so that a maximum amount of supplies or other camping accoutrements, for example, may be hauled during transport.

A further object of the invention is to provide a completely telescoping camper construction which can be operated by a single winch.

An additional object of the invention is to provide balancing spring means for the winch to enable the convenient erection of the cabin construction when desired.

A further object of the invention is to provide a track or rail and wheel means for the sleeper of the cabin so that the same may be telescoped in and out of the principal cabin construction.

An additional object of the invention is to provide a camper construction wherein the front portion thereof may be selectively extended over and be supported by support rails of a passenger cab over towing vehicle.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a fragmentary view of the cabin construction of the present invention when the same is in extended position.

FIGURE 2 illustrates the structure of FIGURE 1 when the same is in collapsed position preparatory for travel.

FIGURE 3 is an enlarged, sectional detail taken along the line 3—3 in FIGURE 11, of a representative corner of the construction; all corners may be alike.

FIGURE 4 is an enlarged sectional detail taken along the line 4—4 in FIGURE 1, and illustrates the portion of the hoisting structure.

FIGURE 5 is a fragmentary sectional view taken along the line 5—5 in FIGURE 1 and illustrates a portion of the structure incorporating the winch mechanism and associated parts.

FIGURE 7 is a front elevation of a pick-up truck having the cabin structure mounting thereon in extended position.

FIGURE 11 is a sectional view taken along a horizontal plane and looking down relative to the structure of the invention.

FIGURE 12 is an enlarged, sectional detail, indicating the sealing of the forwardly extending, front enclosure member of the invention. See line 12—12 in FIGURE 14.

FIGURE 13 is an enlarged sectional detail taken along the line 13—13 in FIGURE 7.

FIGURE 14 is a fragmentary perspective view taken along the arrow A in FIGURE 7, of the top enclosure member of the present invention.

Figure 8:
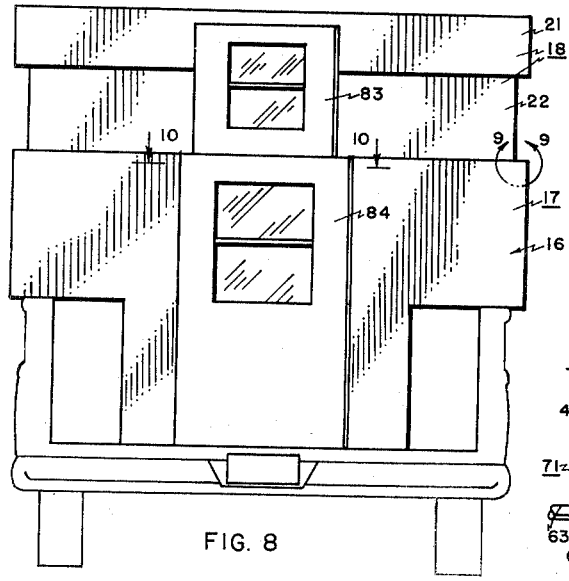
FIGURE 8 is a rear elevation of the structure when mounted on a pick-up truck.

In FIGURE 1, pick-up truck 10 includes a passenger cab 11 having support rails 12 (one being shown) which are mounted to the roof 13 of the cab. Disposed on the bed 14 and between opposite sides 15 of the body of the pick-up truck is a camper construction 16, the same taking the form of a bottom enclosure member 17, a top enclosure member 18 telescopingly received by the former, and a front enclosure member 19. It will be noted relative to FIGURE 2 that the bottom, top and front enclosure members are in retracted position, for vehicle travel. When it is desired that the enclosure within the construction 16 be enlarged, then the top enclosure member 18 will be hoisted or elevated, by means hereinafter described, relative to bottom enclosure member 17 and, subsequently, the front enclosure member 19 will be projected forwardly, in manner hereinafter described, so that the bottom 20 of front enclosure member 19 thereof will engage and hence be supported by the support rails 12. It is to be noted that the top enclosure member 18 includes top and bottom portions 21 and 22 the former of which is enlarged with respect to the latter so as to overlap or span the juncture 23 between bottom and top enclosure members. Preferably, the edges 24 and 25 will be supplied with dowel and dowel hole interengagement means so that when the vehicle's camper construction is collapsed as shown in FIGURE 2, the dowel pins 25 engaging dowel holes 26 will prevent the upper enclosure member from shifting during travel relative to bottom enclosure member 17.

FIGURES 3 and 4 are enlarged, sectional details of the panel construction which may be employed in the present invention; in other figures the entire panel construction assembly is not illustrated in detail, as in FIGURES 3 and 4, but rather is shown as a single thickness unit as, for example, in FIGURE 5.

Figure 6:
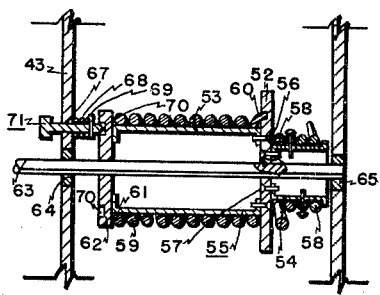
FIGURE 6 is an enlarged detail taken along the line 6—6 in FIGURE 5.

FIGURE 3 is a detail shown in enlarged, fragmentary section of a representative corner of the composite construction as illustrated in FIGURE 6.

In FIGURE 3 a panel construction of the bottom and top enclosure members is shown to include, with reference to the bottom enclosure member 17, skin panels 27 and 28 which are overlapped at their margins by angle strip 29. The basic structure includes plywood panels 30 and 30' and studs 31, secured together in a conventional manner together with plywood panels 32 and 33. A vertical, elongate interior angle strip 34 of suitable metal employs a plurality of attachment means 35 for attaching the angle 34 directly to the interior plywood panels. It is preferable that there be included in the structure suitable bearing means 36 having shafts 37 which are secured by conventional attachments 38 to the plywood panels 32, for example. Similarly constructed is 18, with angle 18′.

It will be noted that the disposition of the bearings 36 at the junctures of the bottom and top enclosure members will insure an easy translation of the latter with respect to the former when the latter is hoisted.

The manner of hoisting top enclosure member 18 is illustrated in FIGURES 1, 4 and 5. A crank or winch 39 is supplied with shaft 40 which is journaled within bearings 41 and 42 of structure 43 associated with the bottom enclosure member 17. Sprocket 44 is keyed to shaft 40 and engages a chain 45 which encompasses cooperating sprocket 46, the latter being keyed to an idler shaft 47. Idler shaft 47 is provided with appropriate bearings 48 and 49 as indicated. Sprocket 46 is keyed to shaft 47, as before explained, as is also the sprocket 50, the latter engaging chain 51 which circumscribingly engages sprocket 52. Sprocket 52 is made integral with drum 53 and also drum 54 which is of reduced diameter with respect to the former. The entire spindle unit 55, which is comprised of members 52, 53 and 54, may be secured together by bolt or other attachments 56 and 57. Elongate means 58, which may take the form of cord or cable, for example, is wrapped around drum 54. Drum 53 serves as a core for torsion spring 59 which is secured at its extremity 60 to sprocket 52 and its remaining extremity 61 to torsion adjustment wheel 62. Wheel 62 is journaled upon shaft 63, and the latter is appropriately bearinged at 64 and 65 as shown in both FIGURES 5 and 6. A detent engagement pin 71 is disposed through aperture 67 and includes a compression spring 68 and retainer pin 69 for thrustingly engaging one of the recessed detents 70 in wheel 62. The pin 71 is preferably supplied with a rounded end which will be ideally suited for engaging the recess detent 70. In operation, torsion spring 59 will be wound appropriately by the rotation of wheel 62, when pin 71 is withdrawn and later reinserted, so as to provide an appropriate balancing spring function which will aid in the hoisting of top enclosure member 18.

Each elongate connector 58 (four in number and in pair being anchored to each drum 54) is respectively passed around pulleys 72 and 73 and outwardly of the bottom enclosure member 17 as at aperture 74, to pass around pulley 75 and be anchored at 76 with top enclosure member 18 as shown in FIGURE 4. (All pulleys may be mounted by their pulley shafts to adjacent studs 31 in a conventional manner.) Aperture 77 in top enclosure member 18 supplies access of the cable or other elongate connector means 58 to the interior of the structure of top enclosure member 18.

The apertures 74 and 77 will be sufficiently enlarged as to accommodate the elongate connector 59 for all dispositions in the latter.

Figure 9:
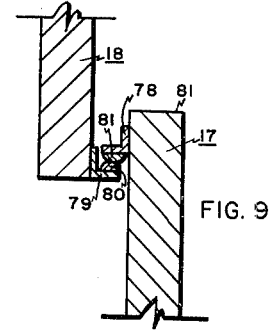
FIGURE 9 is an enlarged detail taken along the arcuate line 9—9 of FIGURE 8.
Figure 10:
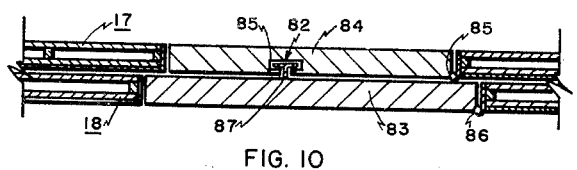
FIGURE 10 is an enlarged sectional view taken along the straight line 10—10 in FIGURE 11 but is rotated 90° in a clockwise direction.

FIGURES 5, 8, and 9 illustrate a manner in which the structure may be weather-sealed during erection condition. Perhaps the best view of this is illustrated in FIGURE 9 which illustrates an enlarged portion of this structure. FIGURE 9 indicates that the bottom enclosure member 17 may interiorly include about the interior periphery thereof an angle 78; correspondingly, a similar angle 79 may be provided the upper or top enclosure member 18. Both may be provided with respective beads 80 and 81 of rubber or "Neoprene," for example, which contact each other upon the hoisting of the top enclosure member 18 relative to bottom enclosure member 17. This will effect a weather-proofing seal between the two enclosure members, notwithstanding the fact that the one is telescopingly received by the other. A similar manner of sealing may be supplied the doors 84 and 83, hinged to the structure in a conventional manner, and which are respectively keyed by any one of a number of suitable means. Thus, FIGURE 10 illustrates in detail the doors 84 and 83 hinged at 85 and 86 to their respective enclosure members and, further, which include a key connection such that the opening of the upper-most door 83 will carry with it the lower-most door 84. Thus, the means 82 may take the form of an under-cut slot 85 in door 84 which is engaged and engaged only when door 83 is hoisted, so that T-configured member 87 can engage the under-cut slot.

It should be observed that the construction as to the hoist and other features will be the same on both sides of the structure. There need only be one crank 39; however, as shown in FIGURE 5, there should be employed in connection with crank 39 a ratchet 88 and a pawl 89 which can be easily released. Thus, the winch action (i.e. turning of crank 39) so as to elevate the top enclosure member 18 with respect to bottom enclosure member 17 may be set at any height; however, the uppermost height is desired wherein the seals close as in FIGURE 9. The winch can be set for this height by pawl 89. Again, torsion spring 59 simply serves as a counterbalancing spring to assist in the raising of structure, and its initial spring tension may be determined by the selected positioning of detent pin 71 with respect to detents 70 a plurality of which will be supplied for the disc or wheel 62.

There remains to be considered a structure of the front enclosure member 19. This construction preferably includes a top panel 90, a front panel 91, and hinged side panels 92 and 93 which are respectively hinged by hinges 94 and 95 to the top panel 90. Panels 92 and 93 will be supplied with angle iron supports 96 which support the margins 97 and 98 of hinge bottom panel or floor means 99, the latter comprising panels 100 and 101 which are secured together by piano hinge 102.

Tracks 103 are disposed on respective sides of the structure at hinge cover 104 and accommodate wheels 105 which are journaled by shafts 106 to top enclosure member 18. While only one wheel is illustrated it will be understood that many, perhaps three or four, will be disposed on either side of the top enclosure member 18 and engage respective track 103. This track and wheel combination has proved to lend ample support to the front enclosure member 18 which may be extended and designed to serve as a sleeper unit. Thus, the wheels 105 disposed on both sides of the sleeper member or front enclosure member 18 will be used to support the sleeper relative to the top enclosure member 18, at least during transport, and preferably also for extended position as shown in FIGURE 1. It will be obvious that some sealing is necessary for the member 18 when the sides 92 and 93 thereof are folded down. This preferably is supplied the structure by elongate rubber seals 107 and 108 at the lapped joint 109 of members 92 and 93 with respective side portions 110 and 111. A slide bolt 112 may be disposed across the juncture to hold it rigid as desired.

The structure is operated as follows. During transport of the structure it will assume a position as shown in FIGURE 2. When a desired camping area is reached, then the winch or crank 39 is turned so that the top enclosure member 18 is elevated or hoisted with respect to bottom enclosure member 17. Upon complete elevation the weather-sealing heretofor described and shown in FIGURE 9 will come into play, whereupon pawl 89 will be set relative to ratchet 88 as in FIGURE 1. At this point the front enclosure member 19 will be translated outwardly and forwardly to rest upon support rails 12 in FIGURE 1. Thereupon, the sides 92 and 93 will be permitted to drop downwardly and the construction locked together by slide bolts 112 as shown in FIGURE 12. At this juncture the structure is ready for occupancy.

Conceivably, additional releasable locking means such as rigid snaps 113 may be used on both sides of the structure to keep the sides in horizontal position when desired. Also, a plurality of tongue and finger, releasable engagement means 114 and 115 (one set being shown) may be employed to secure the hinged bottom panel 99 to vertical front panel 91.

It will be noted that the structure on both sides is operated by a single winch and that the entire structure may be elevated at its four general corner areas by turning of a single crank.

Finally, in practice, with reference to FIGURE 14, the sides 92 and 93 will be dropped first prior to the lowering of hinged bottom panel 99, as the latter at its margins rests upon angle irons 96 of sides 92 and 93.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A trailer construction including, in combination, a top enclosure member, a bottom enclosure member telescopingly encompassing said top enclosure member, means for selectively hoisting said top enclosure member above said bottom enclosure member to enlarge the enclosure space mutually defined by said top and bottom enclosure members, and a front enclosure member including floor means, said front enclosure member being telescopingly received within and, when said top enclosure member is hoisted by said means, being selectively extensible forwardly from said top enclosure member to further enlarge the enclosure defined by said top, bottom and front enclosure members, said top enclosure member including means for supporting said front enclosure member for telescoping movement therewithin.

2. Structure according to claim 1 wherein said top enclosure member spans over the juncture of the top and bottom enclosure members.

3. For support by a vehicle having a passenger cab, said cab being provided with upstanding support rails longitudinally oriented with respect to said cab, a trailer construction including, in combination, a top enclosure member, a bottom enclosure member telescopingly encompassing said top enclosure member, means for selectively hoisting said top enclosure member above said bottom enclosure member to enlarge the enclosure space mutually defined by said top and bottom enclosure members, and a front enclosure member telescopingly received by and selectively extensible forwardly from said top enclosure member and along said support rails, to rest thereupon, to further enlarge the enclosure defined by said top, bottom and front enclosure members.

References Cited in the file of this patent

UNITED STATES PATENTS

| D. 192,795 | Sloat | May 15, 1962 |
| 2,581,556 | Rogers | Jan. 8, 1952 |
| 2,893,780 | Ervine | July 7, 1959 |
| 3,021,170 | Cornelius | Feb. 13, 1962 |

FOREIGN PATENTS

| 329,088 | Great Britain | Jan. 8, 1952 |